May 10, 1932. VIBRATION DAMPENING MOUNTING Re. 18,457

Original Filed Jan. 10, 1927

INVENTOR
Hugh C. Rood

Reissued May 10, 1932 Re. 18,457

UNITED STATES PATENT OFFICE

HUGH C. LORD, OF ERIE, PENNSYLVANIA

VIBRATION DAMPENING MOUNTING

Original No. 1,778,503, dated October 14, 1930, Serial No. 160,223, filed January 10, 1927. Application for reissue filed March 21, 1932. Serial No. 600,808.

In many situations vibration dampening is desirable, as for example motor mountings of different types. Rubber has been used for this purpose and commonly rubber so used has been placed under compression in order to secure the parts in their proper relation. While rubber under compression has some dampening effect depending on the amount of compression as ordinarily compressed this dampening effect is negligible. By placing the rubber under tension its dampening effect may be very much increased and if it is given initial tension a small amount of rubber may be utilized for supporting the load. It is preferable to so arrange the rubber that the major thrust on the mounting subjected to vibration is resisted through the action of shear on the rubber and in the present invention the preferred form is so arranged. Here both the gravity thrust of the motor and the torque thrust of the motor operate on the rubber in shear.

I have exemplified my invention as a mounting for an automobile motor and have illustrated the preferred form of carrying out my invention. Features and details of the invention will appear from the specification and claims.

The invention is illustrated in the accompanying drawings as follows:—

Figure 1:
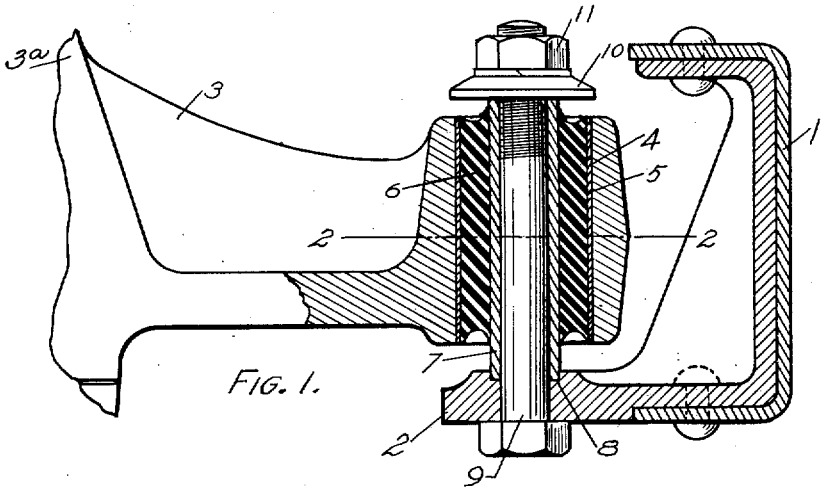
Figure 2:
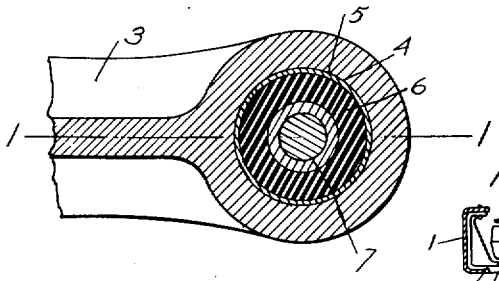

Fig. 1 shows a sectional view of the mounting on the line 1—1 in Fig. 2.

Fig. 2 a sectional view of the mounting on the line 2—2 in Fig. 1.

Figure 3:
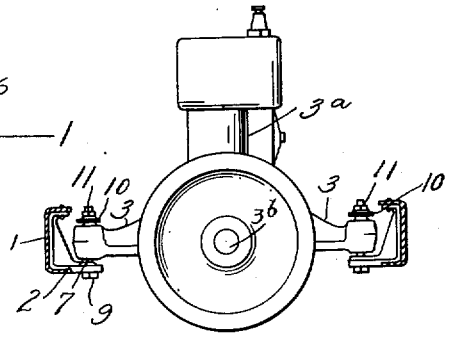

Fig. 3 is an end elevation of an ordinary automobile engine with the mountings in place.

1 marks the channel of the automobile frame, 2 a supporting bracket secured to the channel, and 3 an arm extending from the engine frame for supporting the engine 3*a*, the motor being of the ordinary automobile type delivering its power through the shaft crank 3*b*.

An opening 4 is formed in the arm 3 preferably in a vertical direction. A steel shell 5 is pressed into this opening preferably with a pressed fit. Rubber 6 is secured to the shell 5 by bonding during vulcanization and to a central sleeve 7 also by vulcanization.

The sleeve 7 rests on a seat 8 in the bracket 2 and a bolt 9 extends through the bracket and through the sleeve and is provided with a nut 11 at its upper end which operates on a washer 10 larger than the opening 4 on the upper end and clamps the sleeve on the seat 8.

By bonding the rubber during vulcanization the rubber in cooling shrinks and puts all the rubber in the mounting under initial tension. By arranging the rubber mounting with its shells in a vertical direction all the rubber is equally engaged in carrying the load and the load is suspended through the rubber medium, the rubber being equally stressed in every radial direction. The vertical arrangement is, therefore, preferable. In any case the rubber should be so proportioned to the load that all the rubber remains under tension under the action of the load. Thus the load, or engine is free to move in any direction in response to vibrations but is restrained within close limits.

Further the rubber with the axis of the joint arranged in a vertical direction, as illustrated is subjected to shear and this manner of taking the thrust is also very sensitive to periodic vibrations, and in a very efficient manner insulates the member which is provided with periodic vibration producing means, such as the engine, from the other member which is connected with such vibrating member.

It will be understood that such vibrating members have a very definite period and the idea is to have the mounting out of step with the period of the vibrating member. The period of vibration of a mounting arranged as here illustrated is such that it may be readily arranged to accomplish this purpose in a comparatively small space.

What I claim as new is:—

1. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a mounting of resilient rubber in tension resisting engagement with said opposing surfaces and resisting the major thrust through shearing action on the rubber between its surfaces and the respective opposing surfaces of the said members, the rubber being directly interposed between the engaging surfaces.

2. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a mounting of uncompressed resilient rubber in tension resisting engagement with said opposing surfaces and resisting the major thrust through shearing action on the rubber between its surfaces and the respective opposing surfaces of the said members, the rubber being directly interposed between the engaging surfaces.

3. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended opposing surfaces in substantial alinement with the major thrust under vibration between the members; and a resilient rubber member connected with said surfaces through vulcanization, said rubber being under initial tension and resisting the major thrust through shearing action and tension on the rubber between its surfaces and the respective opposing surfaces of the said members, the rubber being directly interposed between the engaging surfaces.

4. In a vibration dampening mounting, the combination of a supporting and a supported member, one of said members being provided with periodic vibration producing means, said members having a normally fixed relation except for said vibrations, one of said members having walls with securing surfaces at opposite sides of the mounting and an intermediate member between said opposing walls and with opposing surfaces; and a mounting of resilient rubber in tension resisting engagement with the surfaces of the opposite sides and the opposing surfaces of the intermediate member and resisting the major thrust through shearing action on the rubber between its surfaces and the respective opposing surfaces of the said member, the rubber being directly interposed between the engaging surfaces.

5. In a vibration dampening mounting, the combination of a supporting and a supported member, one of said members being provided with periodic vibration producing means, said members having a normally fixed relation except for said vibrations, one of said members having walls with securing surfaces at opposite sides of the mounting and an intermediate member between said opposing walls and with opposing surfaces; and a mounting of resilient rubber connected through vulcanization with the surfaces of the opposite sides and the opposing surfaces of the intermediate member and resisting the major thrust through shearing action and tension on the rubber between its surfaces and the respective opposing surfaces of the said members, the rubber being directly interposed between the engaging surfaces.

6. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber in tension resisting engagement with said opposing surfaces and resisting the major thrust under vibration on the mounting through shearing action on the rubber between its surfaces and the respective opposing surfaces of the said members, the rubber being directly interposed between the engaging surfaces.

7. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to the opposing surfaces by vulcanization and resisting the major thrust under vibration on the mounting through shearing action on the rubber between its surfaces and the respective opposing surfaces of the said members, the rubber being directly interposed by the engaging surfaces.

8. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall with an axis in substantial alinement with the major thrust under vibration and the other of said members a wall intermediate the annular wall, said walls presenting opposing surfaces; and a mounting of resilient rubber in tension resisting engagement with said surfaces and resisting the major thrust under vibration on the mounting through shearing action on the rubber between its surfaces and the respective opposing surfaces of the said members, the rubber being directly interposed between the engaging surfaces.

9. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall with an axis in substantial alinement with the major thrust under vibration and the other of said members a wall intermediate the annular wall, said walls presenting opposing surfaces; and a mounting of resilient rubber secured to the opposing surfaces by vulcanization and resisting the major thrust through the mounting through shearing action on the rubber between its surfaces and the respective opposing surfaces of the said members, the rubber being directly interposed between the engaging surfaces.

10. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to said surfaces by surface bonding and resisting the major thrust under vibration through the tension of the rubber, the rubber being directly interposed between the opposing surfaces.

11. In a vibration dampening mounting, the combination of a supporting and a supported member, one of said members being provided with periodic vibration producing means and the other of said members being insulated therefrom at the mounting, said members having a normally fixed relation except for such vibrations, one of said members having an annular wall and the other of said members a wall intermediate the annular wall, said walls presenting opposing surfaces; and a mounting of resilient rubber under initial tension secured to said surfaces by surface bonding and resisting the major thrust in the direction of the axis of the annular wall, the rubber being directly interposed between the opposing surfaces.

12. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended vertical opposing surfaces, and a mounting of resilient rubber in tension resisting engagement with said opposing surfaces and sustaining the major portion of the load through shearing action on the rubber between its surfaces and the respective opposing surfaces of the said members, the rubber being directly interposed between the opposing vertical engaging surfaces.

13. In a vibration dampening mounting, the combination of a supporting and a supported member, one of said members being provided with periodic vibration producing means and the other of said members being insulated therefrom at the mounting, said members having a normally fixed relation except for said vibrations, said members having walls with extended vertical opposing surfaces, and a resilient rubber member connected with said surfaces through vulcanization, said rubber being under initial tension and sustaining the major portion of the load through shearing action and tension on the rubber between its surfaces and the respective opposing surfaces of said members, the rubber being directly interposed between the opposing vertically connected surfaces.

14. In a vibration dampening mounting, the combination of a supporting and a supported member, one of said members being provided with periodic vibration producing means, and the other of said members being insulated therefrom at the mounting, said members having a normally fixed relation except for said vibration, one of said members having walls with securing vertical surfaces at opposite sides of the mounting and an intermediate member between said opposing walls, said intermediate member having opposing vertical surfaces; and a mounting of resilient rubber in tension-resisting engagement with the surfaces of the opposite sides and the opposing surfaces of the intermediate member and sustaining the major portion of the load through shearing action on the rubber between its surfaces and the respective opposing surfaces on the members, the rubber being directly interposed between the engaging surfaces.

15. In a vibration dampening mounting, the combination of a supporting and a supported member, one of said members being provided with periodic vibration producing means and the other of said members being insulated at the mounting therefrom, said members having a normally fixed relation except for said vibrations, one of said members having an annular wall and the other of said members a wall intermediate the annular wall, said walls presenting opposing vertical surfaces; and a mounting of resilient rubber in tension-resisting engagement with said opposing surfaces and sustaining the major portion of the load through shearing action on the rubber between its surfaces and the respective opposing surfaces of the said members, the rubber being directly interposed between the engaging surfaces.

16. In a vibration dampening mounting, the combination of a supporting and a supported member, one of said members being provided with periodic vibration producing means and the other of said members being insulated therefrom at the mounting, said members having a normally fixed relation except for said vibrations, one of said members having an annular wall and the other of said members a wall intermediate the annular wall, said walls presenting vertical opposing surfaces; and a mounting of resilient rubber under initial tension secured to said surfaces by surface bonding and sustaining the major portion of the load through the rubber directly interposed between said surfaces.

17. In a vibration dampening mounting, the combination of a supporting member and a supported member, one of said members being provided with vibration producing means, and a mounting of resilient rubber bonded to one of said members and disposed in thrust resisting relation with the other member, said mounting including a body of rubber projecting from the member to which the mounting is bonded and so disposed as to receive the thrust through shear stress, the shear being in the direction of the vibratory thrust to be absorbed by the mounting.

18. In a vibration dampening mounting, the combination of a supporting member and a supported member, one of said members being provided with vibration producing means, and a mounting of resilient rubber bonded to one of said members and disposed in thrust resisting relation with the other member, said mounting including a body of rubber projecting from the member to which the mounting is bonded and so disposed as to receive the thrust through shear stress, the shear being in the direction of the vibratory thrust to be absorbed by the mounting, said body absorbing through its shear distortion at least the major portion of said vibratory thrust absorbed by the mounting.

19. In a vibration dampening mounting, the combination of a supporting member and a supported member, one of said members being provided with vibration producing means, and a mounting of resilient rubber bonded to each of the members, said mounting including a rubber body projecting from one of the members and so disposed as to receive the thrust through shear stress, the shear being in the direction of the vibratory thrust to be absorbed by the mounting and the other member being in thrust resisting relation to the rubber body in the direction of shear.

20. In a vibration dampening mounting, the combination of a supporting member and a supported member, one of said members being provided with vibration producing means, and a mounting of resilient rubber bonded to each of the members, said mounting including a rubber body projecting from one of the members and so disposed as to receive the thrust through shear stress, the shear being in the direction of the vibratory thrust to be absorbed by the mounting and the other member being in thrust resisting relation to the rubber body in the direction of shear, said body absorbing through its shear distortion at least the major portion of said vibratory thrust absorbed by the mounting.

21. In a vibration dampening mounting, the combination of a supporting member and a supported member, one of said members being provided with vibration producing means and having a wall with an attaching surface extending in the direction of the vibratory thrust of the vibration producing means and a mounting of resilient rubber bonded to said attaching surface and projecting therefrom and so disposed as to receive the thrust through shear stress, the other of said members being disposed in thrust resisting relation with said body in the direction of shear.

22. In a vibration dampening mounting, the combination of a supporting member and a supported member, one of said members being provided with vibration producing means and having a wall with an attaching surface extending in the direction of the vibratory thrust of the vibration producing means and a mounting of resilient rubber bonded to said attaching surface and projecting therefrom and so disposed as to receive the thrust through shear stress, the other of said members being disposed in thrust resisting relation with said body in the direction of shear, said body absorbing through its shear distortion at least the major portion of said vibratory thrust absorbed by the mounting.

23. In a rubber dampening mounting, the combination of a supporting member and a supported member, one of said members having vibration producing means and one of said members having oppositely disposed attaching parts, and a mounting of resilient rubber bonded to said parts, said mounting including rubber portions interposed between the attaching parts to which the rubber is bonded and so disposed as to receive the thrust through shear stress, the shear being in the direction of the vibratory thrust to be absorbed by the mounting, said resilient mounting being in thrust-resisting relation to the other of said members.

24. In a rubber dampening mounting, the combination of a supporting member and a supported member, one of said members having vibration producing means and one of said members having oppositely disposed attaching parts, and a mounting of resilient rubber bonded to said parts, said mounting including rubber portions interposed between the attaching parts to which the rubber is bonded and so disposed as to receive the thrust through shear stress, the shear being in the direction of the vibratory thrust to be absorbed by the mounting, said resilient mounting being in thrust-resisting relation to the other of said members, said rubber portions absorbing through shear distortion of the rubber at least the major portion of said vibratory thrust absorbed by the mounting.

In testimony whereof I have hereunto set my hand.

HUGH C. LORD.